Jan. 9, 1945.   A. KASSLER ET AL   2,366,967
CONVERTIBLE FREIGHT CAR
Filed Jan. 7, 1942   5 Sheets-Sheet 1

INVENTORS
Adolph Kassler
John B.D. Thompson
BY Donald U. Rich ATTORNEY

Jan. 9, 1945. A. KASSLER ET AL 2,366,967
CONVERTIBLE FREIGHT CAR
Filed Jan. 7, 1942   5 Sheets-Sheet 2
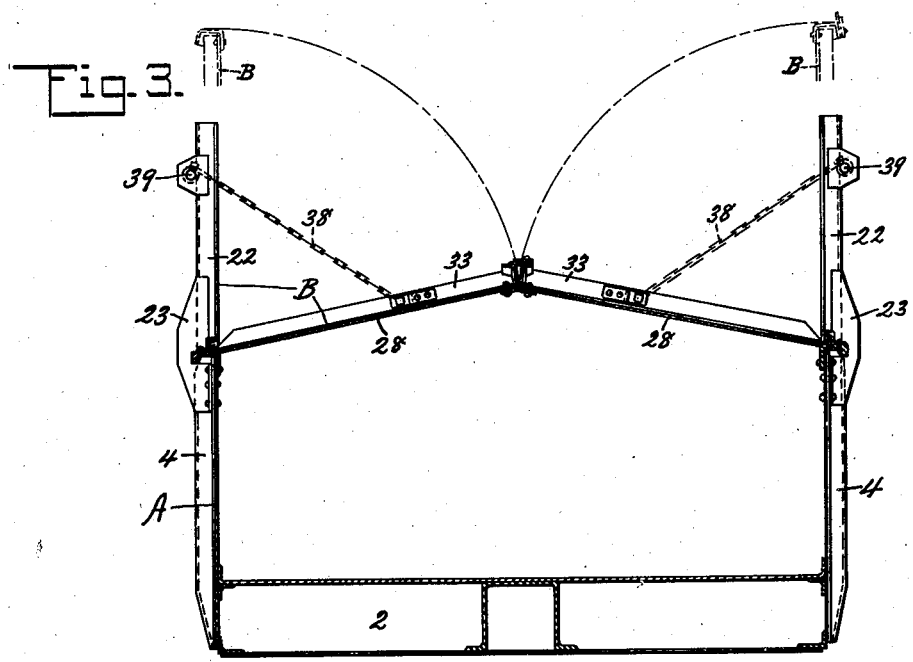
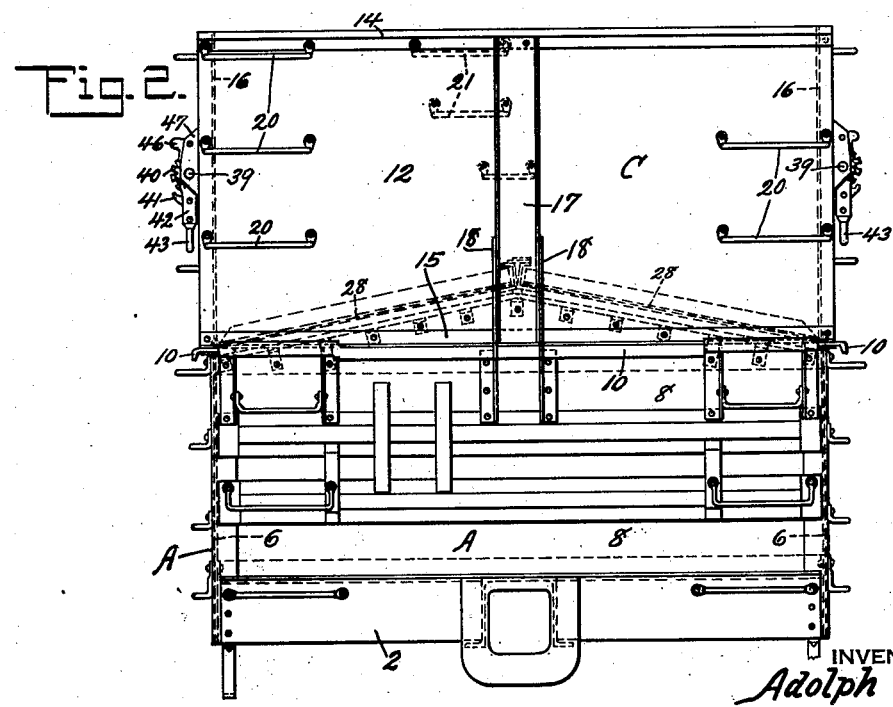
INVENTORS
Adolph Kassler
John B.D. Thompson
BY Donald H. Rich ATTORNEY

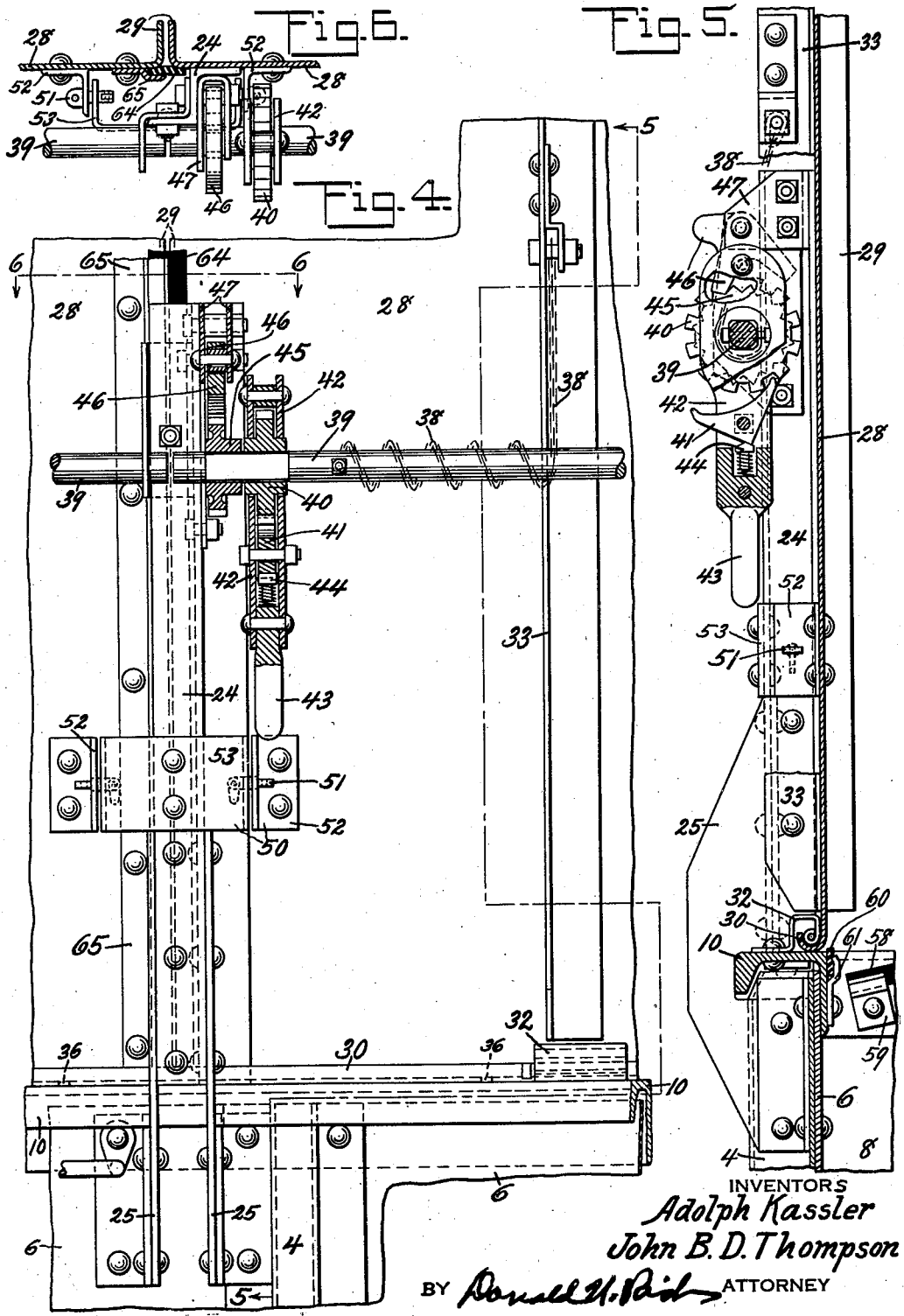

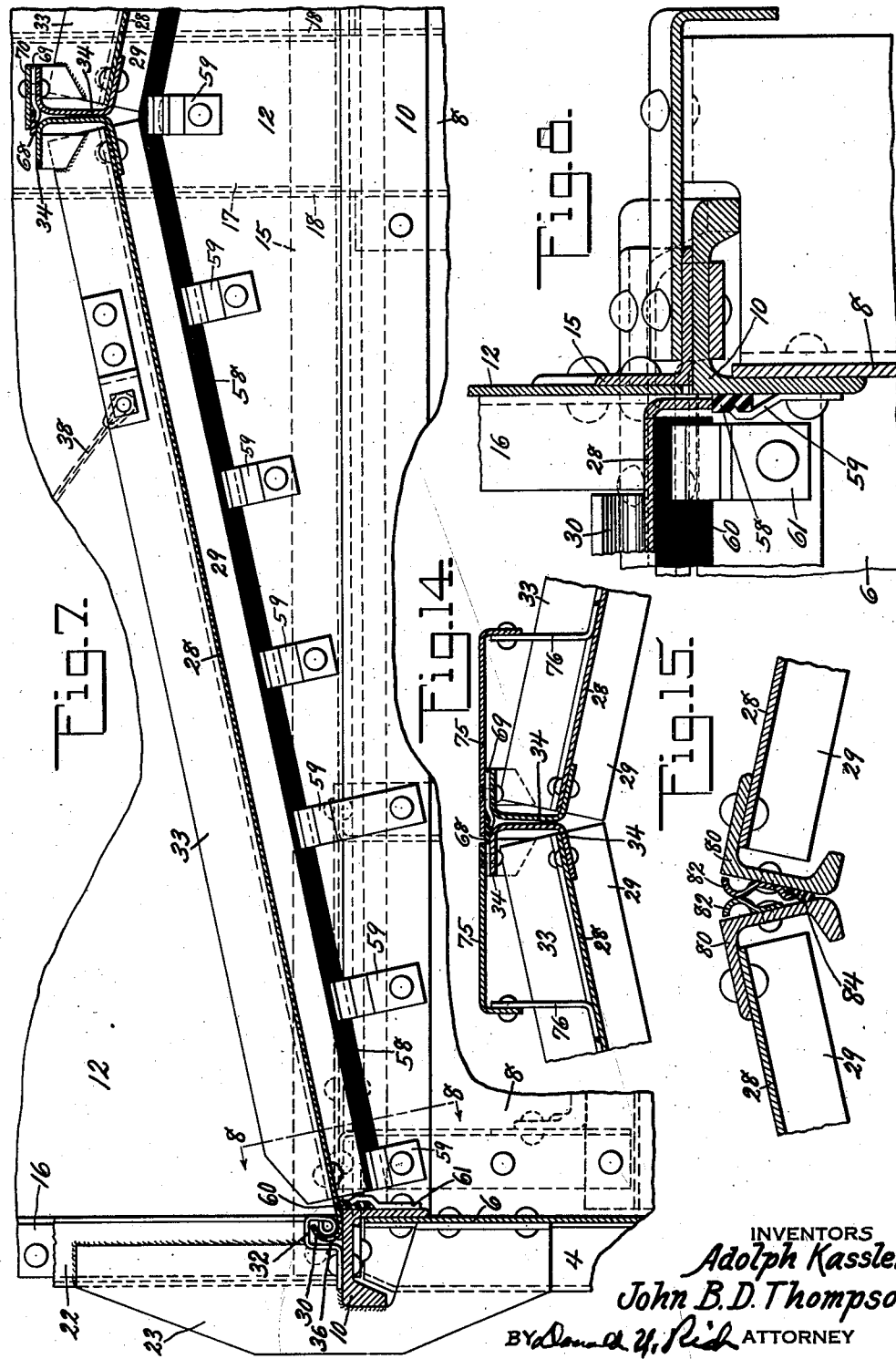

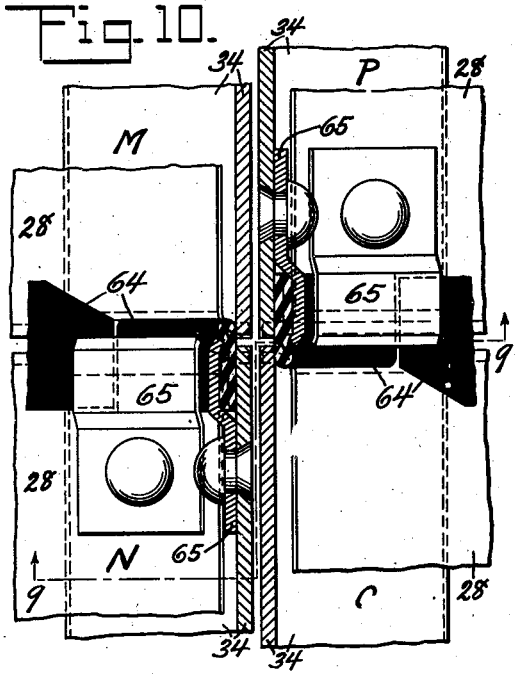
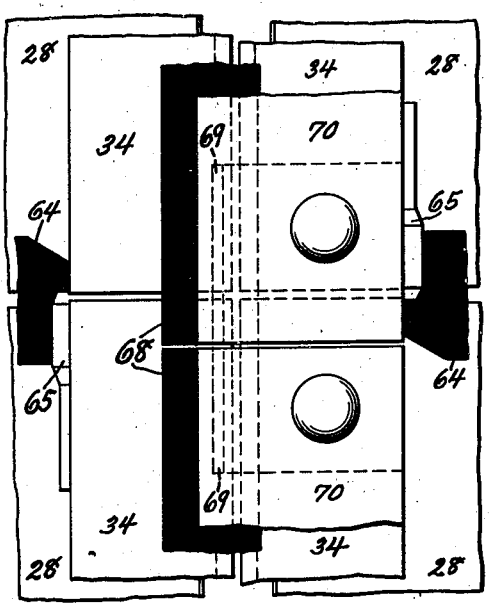
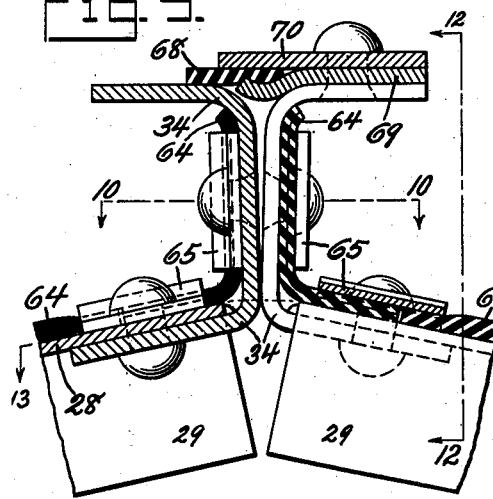
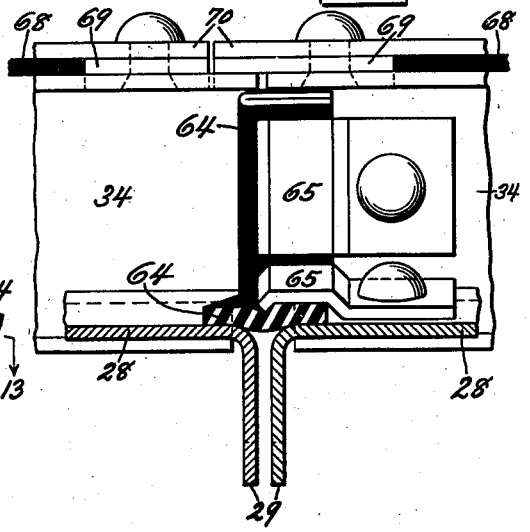
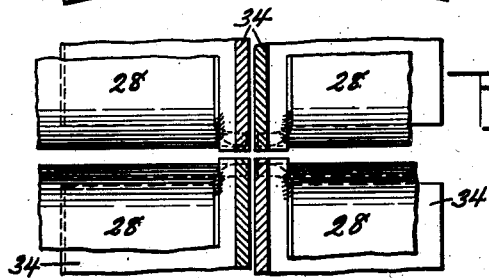

Patented Jan. 9, 1945

2,366,967

UNITED STATES PATENT OFFICE 2,366,967

CONVERTIBLE FREIGHT CAR

Adolph Kassler, New York, N. Y., and John B. D. Thompson, Berwick, Pa., assignors to American Car and Foundry Company, New York, N. Y., a corporation of New Jersey Application January 7, 1942, Serial No. 425,812

21 Claims. (Cl. 105—377)

This invention relates to freight cars in general and in particular to such cars which may be converted from an open to a covered type car.

At present large quantities of sheet steel, aircraft engines, automotive engines and other heavy freight is being shipped either in box cars or in low side gondola cars by the use of special packages protecting the article being shipped. When commodities of this type are shipped in box cars special loading and handling arrangements are necessary, and in most cases must be returned empty to the factory for another load of the commodity being shipped. Such a use of cars is, of course, extremely wasteful and expensive and highly inefficient, particularly in times when efficiency in maximum use of rail services is vitally important. It is an object, therefore, of the present invention to provide means by which low side gondolas may be converted into high side gondolas or to covered low side gondolas.

A further object of the invention is the provision of a covered gondola car in which the roof sections are hinged to the car structure and may be folded back to permit direct loading of the car.

A still further object of the invention is the provision of hinged roof sections carried by the car structure capable of folding down to form a waterproof covering over heavy material carried in the car and which can be loaded directly in the car by use of cranes or other lifting mechanisms.

A yet further object of the invention is the provision of a roofed car in which the roof sections may be hinged to an upright position forming side wall extensions to the end that heavy materials may be carried in a waterproof car from the manufacturer to the user and carry back to the manufacturer relatively light or bulky materials, such as coke, coal or metal turnings.

These and other objects of the invention will be apparent to persons skilled in the art from a study of the following description and accompanying drawings, in which:

Fig. 2 is an end view of the improved car;

Fig. 3 is a sectional view of the improved car showing the roof sections in position to form a roof for the low side gondola;

Fig. 4 is an enlarged elevational view of a part of the car showing particularly the winding mechanism for controlling movements of the hinged sections;

Fig. 5 is a sectional view taken substantially on line 5—5 of Fig. 4;

Fig. 6 is an enlarged sectional view taken substantially on line 6—6 of Fig. 4;

Fig. 7 is an enlarged sectional view showing one of the hinged sections in its roof forming position;

Fig. 8 is a sectional view taken substantially on line 8—8 of Fig. 7 and showing in particular the seal at the end wall of the car;

Fig. 9 is an enlarged sectional view showing in particular the seal at the center of the car and taken substantially on line 9—9 of Fig. 10;

Fig. 10 is a sectional view taken substantially on line 10—10 of Fig. 9 and showing in particular the sealing relationship at the point where four of the sections meet;

Fig. 11 is a plan view of a portion of the hinged sections and showing the relationship of the sections at the point where the four sections meet;

Fig. 12 is a sectional view taken substantially on line 12—12 of Fig. 9 and showing in particular the seal between the hinged sections;

Fig. 13 is a sectional view taken substantially on line 13—13 of Fig. 9;

Fig. 14 is a sectional view similar to Fig. 9 but showing a slight modification thereof in that running board sections have been provided, and Fig. 15 is a sectional view similar to Fig. 9 but showing a slight further modification of the sealing means.

Figure 1:
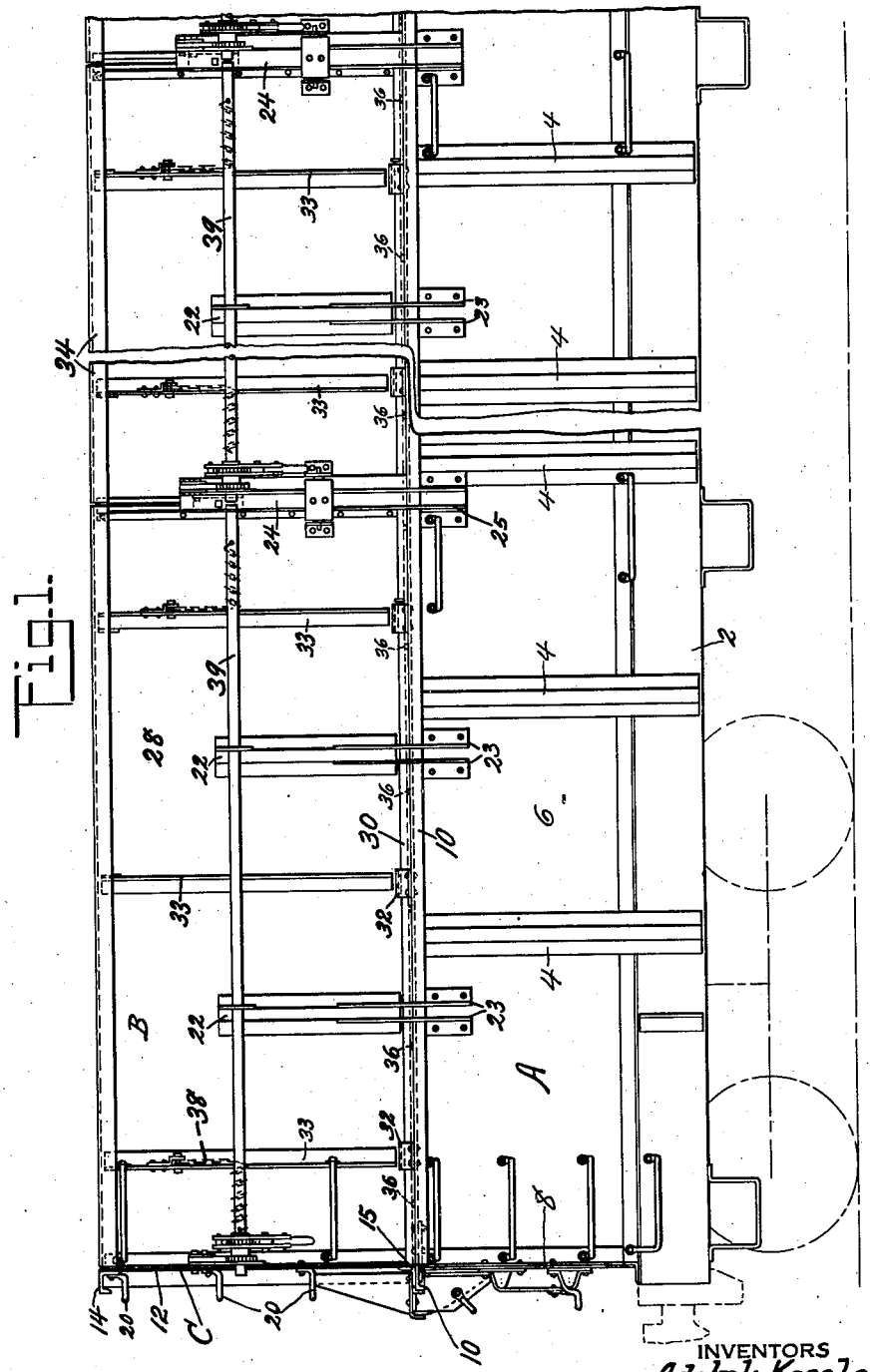
Figure 1 is an elevational view of substantially one-half of the improved car and with the roof sections in raised position forming a high side gondola.

Referring now to the drawings in detail, it will be seen that a more or less conventional low side gondola A has had applied thereto a plurality of stakes and hinged sections B and extension end walls C, thereby forming a high side gondola. It will also be seen that the hinged sections may be lowered to form a roof or cover for the low side gondola. The low side gondola may be of any desired form or construction but in the present case is built with an underframe 2 to which is attached stakes 4, side sheets 6 and end walls 8. The top edges of the side sheets and end walls are attached to permanent top chords 10 of bulb angle formation.

In order to convert the low side gondola, it is only necessary that the prefabricated ends and extension side or hinged sections be attached to the car. The ends, as shown, are formed of sheets 12 carrying at their upper edges a bulb angle member 14 and at their bottom edges an angle 15 (Figs. 1, 2 and 8). The end walls are vertically braced by corner angles 16 and a centrally disposed channel 17 attached by gussets 18 to the end wall top chord and to the end wall sheets of the original low side gondola. The ends are provided with external hand holds 20 and with internally disposed hand holds or grab irons 21, thus making it easy for the trainmen to climb into or out of the car whether it be used as a high side gondola or as a low side covered gondola. Between the end walls of the car a plurality of stub stakes 22 of general flanged channel cross section are attached to the top chord of the low side gondola by means of gusset-like plates 23 atttached to the stakes, to the top chord and to the side walls of the low side gondola (see Figs. 1, 3 and 7). At intermediate points along the car certain other stub stakes 24 of Z bar cross section are provided and these are attached to the top chord and side walls of the low side gondola by means of gusset plates 25, all as clearly shown in Figs. 1, 4, 5 and 6.

The sides of the car, when converted to a high side gondola, are formed of a plurality of sections each formed by sheets 28 flanged as at 29 along their end edges (Figs. 6 and 12) and provided adjacent their lower side with a semicircular roll 30. This roll is adapted to rest upon the top chord of the low side gondola and be held in position by hinge elements 32 secured to the top chord and bearing on the inside of semicircular roll, thus connecting the movable sections to the low side gondola. The sections are braced by means of angle members 33 extending from adjacent the rolled edge of the sheets to the opposite edge which is stiffened by means of a slightly distorted channel form pressing 34 (see Figs. 1, 9 and 14). As shown in the present case, each side is formed of four movable or hinged sections, three only of which are shown in Fig. 1. Also as clearly shown in Figs. 1, 4 and 7 the semicircular roll 30 is pierced at a plurality of points to provide drain openings 36 allowing discharge of water that might otherwise be trapped in the roll and cause corrosion. Raising and lowering of the movable sections may be controlled in any suitable manner but in the present case their movements are controlled by individual winding mechanisms comprising chains or other flexible connections 38 secured to certain of the angle stiffeners 33 and to a winding shaft 39 journaled in the stub stakes 22 and 24 adjacent the upper ends thereof. Rotation of the winding shaft is obtained by independent winding mechanisms comprising a ratchet wheel 40 non-rotatably mounted on the winding shaft and adapted to be engaged by a dog 41 pivoted in a frame 42 rotatable upon the hub of the ratchet wheel and provided with a handle 43 (see Figs. 4 and 5). The dog 41 is double ended and held in either extreme position by means of a spring plunger 44 as is more or less customary with winding mechanisms of this type. The rotation of the winding shaft is controlled and the shaft locked by means of a gear wheel 45 non-rotatably carried by the winding shaft and adapted to be engaged by a double finger locking dog 46 rotatably carried by a bracket 47 secured to the upper end of the stub stakes 24. By proper manipulation of the locking and ratchet dogs an operator may positively raise or lower the sections individually, with the raising and lowering being under his positive control at all times. Although the locking of the winding shaft with the sections in raised or high sided gondola forming position will normally be sufficient, additional locking means 50 are provided which consist of self-locking pins 51 extending through angles 52 carried by each section through brackets 53 carried by the stub stakes 24, all as clearly shown in Figs. 1, 4, 5 and 6.

In order to seal the joints between the sections and between the sections and the end walls and side walls of the car, various resilient seals are provided. As clearly shown in Figs. 7 and 8 the joint between the sections and the rigid end wall is sealed by means of a resilient strip 58 of rubber or other material held in position by clips 59 riveted or otherwise secured to the end walls of the car. As clearly shown in these figures, the resilient strip is inclined to correspond with the incline of the sections when in roof forming position and in tight engagement with the flange 29 of the end sections. The joint between the lower edge of the movable sections and the side walls of the gondola is effectively sealed by means of a resilient sealing strip 60 of rubber or other material fastened to the top chord 10 of the low side gondola by means of clips or strips 61 (see Figs. 5 and 7). As clearly shown, these resilient strips will be compressed slightly by the movable sections when in roof forming position and will extend slightly above the top chord as in Fig. 5 when the sections are in high side gondola forming position. The joint between the end edges of the movable sections is sealed, as clearly shown in Figs. 9, 10 and 12, by means of a sealing strip 64 formed of rubber or other resilient material and held in place on one of the movable sections by means of clips 65 riveted or otherwise secured to the sheets forming the movable section. As clearly shown in Figs. 10 and 12, this resilient strip also extends up along the web of the distorted channel member 34, thereby sealing the joint between the channel members. The joints between the sections on opposite sides of the car are sealed by means of sealing strips 68 of rubber or other resilient material held between lower and upper strips 69 and 70 respectively riveted or otherwise secured to the distorted channel 34 of the sections on one side of the car (see Figs. 7, 9 and 11). The sealing means are attached to the various movable sections in such a manner that an operator can start at one corner of the car to lower the sections and proceed around the car lowering the sections in sequence. That is, as viewed in Fig. 10 an operator would lower section M first, then section N, thus bringing the sealing means 64 of section N into contact with the section M and sealing the joint therebetween. Then as he came back along the opposite side of the car he would lower section O next, then section P, thus bringing the sealing means 64 of section P into overlapping relation with the section O and sealing the joint therebetween. Lowering of sections O and P would, of course, bring the sealing means 68 of each into sealing engagement with the distorted channel form member 34 of sections M and N. In raising the sections they would, of course, be raised in the reverse order. It should be noted that although the chains are intended to hold the sections in their roof forming position, such holding is not absolutely necessary for the channels 34 are distorted slightly so that their webs are in contact as shown in Figs. 3, 7 and 9, thus in effect forming an arch between the side walls of the car and preventing collapse of the section in case the chains are not locked in the proper position or should break.

In some cases it may be necessary or desirable to provide a running board along the roof section of the car and this may be done as shown in Fig. 14, wherein the sealing means and section construction is the same as that previously described and accordingly the same reference numerals have been used. In this form, however, short angle shaped members 75 are secured to the flanges of distorted channels 34 and to brackets 76 fastened to the sheets forming each hinged section. In this manner when the sections are in roof forming position a running board is formed and when the sections are in raised or high side gondola position an extremely strong top chord is provided which does not interfere with the clearance limits imposed by the railroads. In some cases it may be desirable to have the roof as smooth as possible, in which case the upper element of the movable sections may be formed of bulb angles 80 (Fig. 15), with the bulb part located inwardly, thus giving a substantially smooth upper surface to the roof sections. The seal in this case may be formed by means of a spring steel member 82 attached to one of the bulb angles and adapted to contact a spring steel sealing element attached to the bulb angle of the adjacent section as clearly shown in the figure. One or both of the spring steel elements may hold in place a sealing strip 84 of rubber or other resilient material adapted to be compressed and effectively prevent entrance of moisture into the car when the sections are in lowered or roof forming position.

It will be seen from the preceding description that a conventional low side gondola car has been modified by attaching thereto stub stakes, extension end walls and winding mechanisms, which mechanisms control the movements and position of movable or hinged sections extending along each side of the car. These sections are movable under control of the winding mechanism from a vertical position supported by the stub stakes to a lowered position forming a roof for the low side gondola. When the movable side sections are in raised or vertical position the joints between the sections are sealed by sealing strips 64, thus preventing leakage between the sections. Bulging of the sections is, of course, prevented by means of the stub stakes securely anchored to the side walls of the low side gondola and the car is in condition to carry light or bulky material or to be loaded with heavy material by means of cranes or other lifting mechanisms. In case heavy material that needs to be protected, such as sheet steel, engines, etc., is loaded in the car, then the hinged sections may be lowered in sequence under control of the winding mechanisms and assume the positions shown in full line by Fig. 3. With the sections in this position the joints between the sections and between the sections and the end wall and side walls are effectively sealed and entrance of moisture into the car is prevented. It should also be noted that when the sections are in lowered or roof forming position the end walls project above the roof but in no way hamper passage of the train crew since grab irons are provided both interior and exterior of the end walls. It should also be noted that the car is quite safe for passage of trainmen along the roof even if a running board is not provided for the stub stakes and winding shaft form, as shown in Fig. 3, guard rails making it almost impossible for a trainman to fall off of the car.

While the invention has been described more or less in detail with particular reference to the drawings, it will be obvious to persons skilled in the art that various modifications and rearrangements of parts other than those shown and described may be made and all such modifications and rearrangements of parts are contemplated as will fall within the scope of the appended claims defining our invention.

What is claimed is:

1. In a convertible freight car the combination of substantially rigid side walls and end walls and a floor defining a lower lading space, rigid side stakes secured to the rigid side walls and extending thereabove, movable side wall sections hingedly connected to the rigid side walls and wholly independent of said rigid side stakes, said movable side wall sections being movable from substantially vertical positions in which they form extension side walls braced by the rigid side stakes to inclined positions forming a complete roof for said lower lading space.

2. In a convertible freight car the combination of substantially rigid side walls and end walls and a floor defining a lower lading space, rigid side stakes secured to the rigid side walls and extending thereabove, a plurality of movable side wall sections each hingedly connected to the rigid side walls and wholly independent of said rigid side stakes, said movable side wall sections being movable from substantially vertical positions in which they form extension side walls braced by the rigid side stakes to inclined positions forming a complete roof for said lower lading space, and sealing means closing the joints between said movable sections in both the vertical and inclined positions.

3. In a convertible freight car the combination of substantially rigid side walls and end walls and a floor defining a lower lading space, rigid side stakes secured to the rigid side walls and extending thereabove, a plurality of movable side wall sections each hingedly connected to the rigid side walls and wholly independent of said rigid side stakes, said movable side wall sections being movable from substantially vertical positions in which they form extension side walls braced by the rigid side stakes to inclined positions forming a complete roof for said lower lading space, sealing means closing the joints between said movable sections in both the vertical and inclined positions, and additional sealing means closing the longitudinally extending joint between the sections when in inclined position.

4. In a convertible freight car the combination of substantially rigid side walls and end walls and a floor defining a lower lading space with the upper part of said end walls projecting above said lading space, rigid side stakes secured to the rigid side walls and extending thereabove, a plurality of movable side wall sections each hingedly connected to the rigid side walls and wholly independent of said rigid side stakes, said movable side wall sections being movable from substantially vertical positions in which they form extension side walls braced by the rigid side stakes to inclined positions forming a complete roof for said lower lading space, and sealing means closing the joints between the movable sections and between the movable sections and the upper part of said end walls of the car when said sections are in inclined position forming a roof.

5. In a convertible freight car the combination of substantially rigid side walls and end walls and a floor defining a lower lading space, rigid side stakes secured to the rigid side walls and extending thereabove, movable side wall sections hingedly connected to the rigid side walls and wholly independent of said rigid side stakes, said movable side wall sections being movable from substantially vertical positions in which they form extension side walls braced by the rigid side stakes to inclined positions forming a complete roof for said lower lading space, and operating means carried by said side stakes and secured to said sections to move the same between said vertical and inclined positions.

6. In a convertible freight car the combination of substantially rigid side walls and end walls and a floor defining a lower lading space, side stakes secured to the rigid side walls and extending thereabove, movable side wall sections hingedly connected to the rigid side walls, said movable side wall sections being movable from substantially vertical positions in which they form extension side walls braced by the side stakes to inclined positions forming a complete roof for said lower lading space, and operating means carried by said side stakes and secured to said sections to move the same between said vertical and inclined positions, said operating means being carried by said side stakes adjacent the upper ends thereof and forming guard rails when said sections are in inclined position forming a roof.

7. In a convertible freight car the combination of substantially rigid side walls and end walls and a floor defining a lower lading space, side stakes secured to the rigid side walls and extending thereabove, movable side wall sections hingedly connected to the rigid side walls, said movable side wall sections being movable from substantially vertical positions in which they form extension side walls braced by the side stakes to inclined positions forming a complete roof for said lower lading space, and operating means carried by said side stakes and secured to said sections to move the same between said vertical and inclined positions, said operating means also serving as securing means holding said sections in the vertical and inclined positions.

8. In a convertible freight car the combination of a floor bounded by rigid side walls and end walls defining a lower lading space with the upper part of said end walls projecting above said lading space, and movable side wall sections hinged to said rigid side walls and movable from vertical to inclined positions, said movable side wall sections when in vertical position cooperating with the upper part of said end walls to define an upper lading space continuous with the lower lading space, and said movable side wall sections when in inclined position forming a roof between the end walls covering said lower lading space.

9. In a convertible freight car the combination of spaced apart rigid side walls and end walls defining with the car floor a lower lading space, a plurality of relatively movable side wall sections on each side of the car each hinged to the rigid side walls and movable from vertical lading retaining positions substantially in alignment with the rigid side walls to inclined positions in which the upper edges of the sections abut and form a roof over the lower lading space, said sections when in vertical position being adapted to retain lading thereby providing increased lading space for the car.

10. In a convertible freight car the combination of spaced apart rigid side walls and end walls defining with the car floor a lower lading space, a plurality of relatively movable side wall sections on each side of the car each hinged to the rigid side walls and movable from vertical lading retaining positions substantially in alignment with the rigid side walls to inclined positions in which the upper edges of the sections abut and form a roof over the lower lading space, and sealing means closing the joint between the adjacent movable side wall sections on each side of the car when said sections are in vertical lading retaining and in inclined roof forming positions.

11. In a convertible freight car the combination of spaced apart rigid side walls and end walls defining with the car floor a lower lading space, a plurality of relatively movable side wall sections on each side of the car each hinged to the rigid side walls and movable from vertical lading retaining positions substantially in alignment with the rigid side walls to inclined positions in which the upper edges of the sections abut and form a roof over the lower lading space, said movable side wall sections being formed with top chord members adapted to abut substantially at the longitudinally extending vertical center plane of the car when the sections are in inclined positions forming a roof.

12. In a convertible freight car the combination of spaced apart rigid side walls and end walls defining with the car floor a lower lading space, a plurality of relatively movable side wall sections on each side of the car hinged to the rigid side walls and movable from vertical positions substantially in alignment with the rigid side walls to inclined positions in which the upper edges of the sections abut and form a roof over the lower lading space, said movable side wall sections being formed with top chord members adapted to abut substantially at the longitudinally extending vertical center plane of the car when the sections are in inclined positions forming a roof, and means secured to said top chord members and cooperating to form a running board when the sections are in the inclined positions forming the roof.

13. In a convertible freight car the combination of spaced apart rigid side walls and end walls defining with the car floor a lower lading space, a plurality of relatively movable side wall sections on each side of the car each hinged to the rigid side walls and movable from vertical lading retaining positions substantially in alignment with the rigid side walls to inclined positions in which the upper edges of the sections abut and form a roof over the lower lading space, said movable side wall sections being formed with top chord members adapted to abut substantially at the longitudinally extending vertical center plane of the car when the sections are in inclined positions forming a roof, and sealing means secured to said top chord members and sealing the longitudinally extending joint therebetween when said sections are in the inclined positions forming the roof for the car.

14. In a convertible freight car the combination of spaced apart rigid side walls and end walls defining with the car floor a lower lading space, a plurality of relatively movable side wall sections on each side of the car each hinged to the rigid side walls and movable from vertical lading retaining positions substantially in alignment with the rigid side walls to inclined positions in which the upper edges of the sections abut and form a roof over the lower lading space, and sealing means secured to the edge portions of certain of said sections and adapted to overlap the adjacent edge portions of other of said sections to thereby seal the joints between the sections when in vertical lading retaining and in inclined roof forming positions.

15. In a convertible freight car the combination of substantially rigid side walls and end walls and a floor defining a lower lading space with the upper part of said end walls projecting above said lading space, side stakes secured to the rigid side walls and extending thereabove, movable side wall sections each hingedly connected to the rigid side walls and when in vertical position being of a height substantially equal to the height of the end walls to define an upper lading space, said movable side wall sections being movable from substantially vertical positions in which they form extension side walls braced by the side stakes to inclined positions forming between the end walls a complete roof for said lower lading space.

16. In a convertible freight car the combination of substantially rigid side walls and end walls and a floor defining a lower lading space with the upper part of said end walls projecting above said lading space, side stakes secured to the rigid side walls and extending thereabove, a plurality of movable side wall sections each hingedly connected to the rigid side walls and of a height substantially equal to the height of the upper part of said end walls to define an upper lading space, said movable side wall sections being movable from substantially vertical positions in which they form extension side walls braced by the side stakes to inclined positions forming between the upper part of the end walls a complete roof for said lower lading space, sealing means closing the joints between said movable sections in both the vertical and inclined positions, and additional sealing means closing the longitudinally extending joint between the sections when in inclined position.

17. In a convertible freight car the combination of substantially rigid side walls and end walls and a floor defining a lower lading space with the upper part of said end walls projecting above said lading space, side stakes secured to the rigid side walls and extending thereabove, a plurality of movable side wall sections each hingedly connected to the rigid side walls and of a height substantially equal to the height of the upper part of said end walls, said movable side wall sections being movable from substantially vertical positions in which they form extension side walls defining an upper lading space braced by the side stakes to inclined positions forming between the upper part of the end walls a complete roof for said lower lading space, and operating means carried by said side stakes and secured to said movable side wall sections to move the same between their vertical wall forming and inclined roof forming positions.

18. In a convertible freight car the combination of substantially rigid side walls and end walls and a floor defining a lower lading space with the upper part of said end walls projecting above said lading space, side stakes secured to the rigid side walls and extending thereabove, a plurality of movable side wall sections hingedly connected to the rigid side walls and of a height substantially equal to the height of the upper part of said end walls, said movable side wall sections being movable from substantially vertical positions in which they form extension side walls braced by the side stakes to inclined positions forming between the upper part of the end walls a complete roof for said lower lading space, and operating means carried by said side stakes and secured to said movable side wall sections to move the same between their vertical wall forming and inclined roof forming positions, said operating means being carried by said side stakes at a level below the upper edge of the upper part of said end walls and forming guard rails between the end walls when said movable sections are in their inclined roof forming positions.

19. An extension end wall for gondola cars having means adjacent its lower edge secured to its outer surface and by which the extension end wall may be rigidly attached to the existing end wall of a low side gondola car to form a rigid upper portion of the end wall of a high side gondola, said extension end wall having also support means attached to the inner surface thereof and adapted to provide a support for the end of a roof for the low side gondola.

20. An extension side wall section for gondola cars having the lower edge rolled to provide a hinge portion by means of which the section may be hingedly secured to the upper edge of the existing side wall of a low side gondola car, said section having sealing means secured to at least one side edge thereof and adapted to cooperate with the side edge of a similar section to form a tight upper lading retaining portion of a high side gondola car.

21. An extension side wall section for gondola cars having the lower edge rolled to provide a hinge portion by means of which the section may be hingedly secured to the upper edge of the existing side wall of a low side gondola car, said section having sealing means secured to at least one side edge thereof and adapted to cooperate with the side edge of a similar section to form a tight upper lading retaining portion of a high side gondola car, said section having the edge remote from the hinged edge provided with sealing means adapted to cooperate with similar sealing means to provide a roof portion for the low side gondola.

ADOLPH KASSLER.
JOHN B. D. THOMPSON